(12) United States Patent
Horacek (10) Patent No.: US 12,331,777 B2
(45) Date of Patent: Jun. 17, 2025

(54) BOWDEN CABLE COUPLING FOR RELEASABLY COUPLING A FIRST BOWDEN CABLE TO A SECOND BOWDEN CABLE

(71) Applicant: GKF Invest GmbH, Ransbach-Baumbach, DE (US)

(72) Inventor: Gregor Horacek, Ransbach-Baumbach (DE)

(73) Assignee: GKF Invest GmbH, Ransbach-Baumbach (DE)

( * ) Notice: Subject to any disclaimer, the term of this patent is extended or adjusted under 35 U.S.C. 154(b) by 0 days.

(21) Appl. No.: 18/539,692

(22) Filed: Dec. 14, 2023

(65) Prior Publication Data
US 2024/0200591 A1 Jun. 20, 2024

(30) Foreign Application Priority Data
Dec. 14, 2022 (DE) .................. 10 2022 133 228.4

(51) Int. Cl.
*F16C 1/10* (2006.01)
(52) U.S. Cl.
CPC .................. *F16C 1/101* (2013.01)
(58) Field of Classification Search
CPC ............. F16C 1/101; F16C 1/145; F16C 1/14
See application file for complete search history.

(56) References Cited

U.S. PATENT DOCUMENTS

| 2,416,206 | A | | 2/1947 | Norton | |
|---|---|---|---|---|---|
| 5,246,303 | A | * | 9/1993 | Trilla | F16C 1/101 403/302 |
| 6,349,614 | B1 | * | 2/2002 | Matsuo | F16G 11/10 74/501.5 R |
| 7,559,252 | B2 | | 7/2009 | Schadler et al. | |
| 2003/0080572 | A1 | * | 5/2003 | So | E05B 79/20 292/336.3 |
| 2011/0100150 | A1 | * | 5/2011 | Tarver | F16H 63/3491 74/502.6 |

FOREIGN PATENT DOCUMENTS

| DE | 722 661 C | | 9/1942 | |
| DE | 10315692 A1 | * | 11/2004 | ............. F16C 1/101 |
| DE | 10 2006 057 326 A1 | | 6/2008 | |
| DE | 102018204351 A1 | * | 9/2019 | |
| EP | 1406023 A2 | * | 4/2004 | ............. F16C 1/101 |
| EP | 2 495 460 A2 | | 9/2012 | |

\* cited by examiner

*Primary Examiner* — Daniel D Yabut
(74) *Attorney, Agent, or Firm* — NK Patent Law (57) ABSTRACT

A Bowden cable coupling for releasably coupling a first Bowden cable to a second Bowden cable is configured and operable to transmit mechanical forces from an activation element to a functional element. The Bowden cable coupling has a first coupling unit which is connected to the first Bowden cable, a second coupling unit which is connected to the second Bowden cable, and a coupling sleeve for connecting the first coupling unit and the second coupling unit together, wherein the first coupling unit and the coupling sleeve are releasably connected to one another by way of a bayonet closure.

16 Claims, 5 Drawing Sheets

BOWDEN CABLE COUPLING FOR RELEASABLY COUPLING A FIRST BOWDEN CABLE TO A SECOND BOWDEN CABLE

CROSS-REFERENCE TO RELATED APPLICATION

This United States nonprovisional utility patent application claims the benefit of the priority of German Patent Application No. DE 10 2022 133 228.4 filed Dec. 14, 2022, the entire disclosure of which is incorporated herein by reference.

FIELD OF THE INVENTION

The invention relates to a Bowden cable coupling for releasably coupling a first Bowden cable to a second Bowden cable.

BACKGROUND OF THE INVENTION

Bowden cables are used to transmit mechanical forces from an activation element to a functional element. Bowden cables comprise a wire cable, which in most instances is of a stranded type, also referred to as the core, wherein the core is guided in a Bowden cable sheath so as to be displaceable in the axial direction of the core. The core typically protrudes at both ends of the Bowden cable and at said ends has connector pieces, for example in the form of retaining nipples, by way of which the one end of the core can be fastened to an activation element, and the other end can be fastened to a functional element to be activated. However, it may also be the case that a retaining nipple is provided only at one end, and the other end is connected to the functional element, or the activation element, by way of a clamp screw.

Bowden cables are known, inter alia, from bicycles, in particular in the form of shift cables or brake cables. Bowden cables are also used, for example, in prams, wheelchairs and therapy chairs, in particular for transmitting the mechanical forces of a brake lever to a wheel brake. In the case of elements which are connected to one another by way of a Bowden cable there is a set of issues pertaining to the fact that releasing the connection is time-consuming and typically also cannot be performed without tools. This situation is problematic in particular when components are to be separated whereby one component supports the activation element and the other component supports the functional element. For example, it may be necessary or envisaged that a handlebar having a brake lever is to be removed from a bicycle frame, in order to enable separate storage or to minimize a packing size. It may also be envisaged that a bicycle frame per se is separable or foldable. Even if the Bowden cable can be released from one of the elements, there is often the set of issues that this cannot be performed without tools. Also, releasing an end of the Bowden cable from one of the elements, for example the element connected to the handle, has the disadvantage that the Bowden cable is then unsupported over a great length in such a way that this unsupported part is suspended and can swing back and forth. Moreover, when releasing in such a way, there is the set of issues when reconnecting the Bowden cable that it cannot be ensured that an effective length of the Bowden cable upon connecting is identical to an effective length prior to connecting, which can lead to an undesirable change in the activation travel of the activation element or requires a correction of the effective length, respectively. With a view to components to which elements that are connected to one another by way of a Bowden cable are attached being released from one another, it is therefore advantageous for the Bowden cable per se to be separable in a region between the two elements, as long as the Bowden cable per se has Bowden cables, or Bowden cable portions, which are releasably coupled to one another.

Bowden cable couplings for releasably coupling two Bowden cables or Bowden cable portions are fundamentally known from the prior art. Such a Bowden cable coupling is described in EP 2 495 460 A2, for example. However, the handling of this Bowden cable coupling for releasing and connecting is complex. Moreover, the Bowden cable coupling described therein is not suitable for frequent opening and closing.

There is, therefore, a demand for a quick release coupling for Bowden cables that is easy to operate.

OBJECT AND SUMMARY OF THE INVENTION

This object is achieved by a Bowden cable coupling which has the features shown and described herein, and by an assembly of a Bowden cable coupling shown and described herein. Refinements, further advantages and features of the invention are derived from the general description and the description of the exemplary embodiments provided herein.

The invention relates to a Bowden cable coupling for releasably coupling a first Bowden cable to a second Bowden cable, having:
  a first coupling unit, wherein the first coupling unit has a first guide bushing and a first sliding unit, wherein the first sliding unit is connected to a core of the first Bowden cable, wherein the first guide bushing has a passage opening for the core of the first Bowden cable, wherein the first sliding unit is mounted in the first guide bushing so as to be displaceable in the axial direction;
  a second coupling unit, wherein the second coupling unit has a second guide bushing and a second sliding unit, wherein the second sliding unit is connected to a core of the second Bowden cable, wherein the second guide bushing has a passage opening for the core of the second Bowden cable, wherein the second sliding unit is mounted in the second guide bushing so as to be displaceable in the axial direction; and
  a coupling sleeve,
wherein the second coupling unit is connected to the coupling sleeve, wherein the second guide bushing is mounted in the coupling sleeve so as to be displaceable in the axial direction, and the second sliding unit is connected to the coupling sleeve so as to be positionally fixed, wherein the first coupling unit is releasably coupled to the coupling sleeve by way of a bayonet closure, wherein the first sliding unit has a first constituent part of the bayonet closure and the coupling sleeve has a second constituent part of the bayonet closure that corresponds to the first constituent part, wherein the first coupling unit is insertable into the coupling sleeve in the axial direction and the first sliding unit by rotating in a rotation direction about the axial direction is able to be transferred to a closure position of the bayonet closure, wherein in the closure position the first guide bushing is mounted in the coupling sleeve so as to be displaceable in the axial direction and the first sliding unit is coupled to the coupling sleeve in such a way that in the closure position, thus the position in which the first and the second sliding unit are coupled to one another by way of the coupling sleeve, relative movements of the sliding units in relation to the guide bushings are mutually coupled by way of the coupling sleeve.

Simple, reliable and quick coupling and decoupling of the first coupling unit and the coupling sleeve is possible by providing the bayonet closure.

In principle, two different cases are conceivable in terms of the relative movement of the guide bushings in relation to the coupling sleeve.

In the first case, the coupling sleeve is stationary. For example, the coupling sleeve could be fastened so as to be stationary, thus locationally fixed and immovable, on a component, for example a framework or frame, an activation element for activating the coupled Bowden cables, or a functional element to be activated by way of the coupled Bowden cables, also being fastened to said component. In the case of a stationary coupling sleeve, the sliding units are then likewise stationary. When the coupled Bowden cables are activated, the sliding units and the cores connected thereto are then not moved, or pulled, in relation to the Bowden cable sheaths, because the sliding units are fixedly established by the coupling sleeve. Instead, the Bowden cable sheaths, conjointly with the guide bushings, are displaced in relation to the stationary cores and thus correspondingly displaced in the axial direction in the stationary coupling sleeve.

In the second case, the coupling sleeve is not stationary. In the case of a non-stationary coupling sleeve, the cores and thus the sliding units are moved as customary when the coupled Bowden cables are activated, because the movements of the sliding units are coupled to one another by way of the coupling sleeve. When activated, the coupling sleeve is therefore displaced in relation to the guide bushings.

The term "axial direction" is presently in particular identical to the longitudinal direction of extent of the core. Typically, the respective Bowden cable and thus also the respective core will be guided in a curved manner. The axial direction in this instance relates to the longitudinal direction of extent of the core in the corresponding region of the core.

It is considered advantageous for the second coupling unit to be non-releasably connected to the coupling sleeve. This simplifies the handling, and loss of the coupling sleeve is avoided. In principle however, it is also conceivable that the second coupling unit is likewise connected to the coupling sleeve by way of a bayonet closure.

It is considered particularly advantageous for the respective guide bushing to form a counter-bearing for the Bowden cable sheath of the respective Bowden cable.

In a particular embodiment it is provided that the guide bushings are supported on one another in the axial direction at least when the Bowden cables are activated. A certain degree of play between the guide bushings has proven advantageous with a view to simplifying coupling and decoupling.

The coupling sleeve is configured to be cylindrical, in particular circular-cylindrical.

In another embodiment, the first sliding unit has protrusions that project radially outward in relation to the first guide bushing, wherein these protrusions form the first constituent part of the bayonet closure. In this context, it is considered particularly advantageous for the coupling sleeve to have slots or grooves which correspond to the protrusions and form the second constituent part of the bayonet closure. Such a slot has a longitudinal slot which proceeds from an insertion end of the coupling sleeve and runs in the axial direction and on the rear closed end thereof transitions into a transverse slot.

In a refinement, the first sliding unit has a main body which is guided axially in the first guide bushing, wherein the first sliding unit has a locking pin for securing the main body against falling out of the first guide bushing, wherein the locking pin penetrates the main body and the first guide bushing transversely to the axial direction, and wherein opposite ends of the locking pin form the protrusions of the bayonet closure that protrude radially outward in relation to the first guide bushing.

In another embodiment, the second sliding unit, like the first sliding unit, has a main body which is guided axially in the second guide bushing, wherein the second sliding unit likewise has a locking pin for securing the main body against falling out of the second guide bushing, wherein the locking pin penetrates the main body and the second guide bushing transversely to the axial direction. As opposed to the first sliding unit, it is provided in the second sliding unit that the opposite ends of the locking pin are received in a form-fitting manner in opposite receptacle openings of the coupling sleeve. A release, or a bayonet closure, is not provided here.

The use of a main body and a locking pin offers advantages when assembling. In this way, the main body can first be introduced axially into the guide bushing and then be secured against falling out by inserting the locking pin. In principle, it is conceivable that there is an interference fit between the locking pin and the main body in the assembled state in such a way that the sliding unit can be disassembled only with a very high effort in terms of force. However, against the background of ideally easy assembling it is considered advantageous for the locking pin and the main body to be kept connected by way of the respective Bowden cable core. For this purpose, it is provided in an embodiment that the core of the Bowden cable penetrates the main body as well as the locking pin. For this purpose, the main body and the locking pin have passage openings, wherein the core penetrates these passage openings in the assembled state. As a result, it is prevented by the core that the locking pin can be pushed out of the main body, or fall out of the latter, in the assembled state. Assembling the coupling unit can take place as follows: first, the main body is inserted into the guide bushing in the axial direction. Thereafter, the locking pin is inserted into the main body, transversely to the axial direction, so as to secure the main body against falling out of the guide bushing. The locking pin is inserted in such a manner that the passage openings of the locking pin and the main body are co-aligned. Thereafter, the core is threaded in such a manner that the core penetrates the co-aligned passage openings of the main body and the locking pin and the passage opening of the guide bushing.

A connection between the respective sliding unit and the respective core is performed by way of a retaining nipple, which is connected to the core, and a corresponding nipple bearing which is configured in the sliding unit. In an embodiment having a locking pin and a main body it is considered particularly advantageous for the locking pin and the main body to form sub-regions of the nipple bearing that are mutually adjacent in the axial direction. When the retaining nipple is disposed in the nipple bearing, the retaining nipple secures the locking pin in the main body as a result.

In another embodiment it is provided that the first sliding unit in the first guide bushing is displaceable in the axial direction between a proximal terminal position facing the second coupling unit and a distal terminal position facing away from the second coupling unit, and/or wherein the second sliding unit in the second guide bushing is displaceable in the axial direction between a proximal terminal position facing the first coupling unit and a distal terminal position facing away from the first coupling unit. It is considered particularly advantageous herein for the respective guide bushing to have a guide slot which is closed at the end side and in which the respective sliding unit is guided in the axial direction. As a result, the respective sliding unit is captively mounted and guided in the respective guide bushing.

In a refinement it is provided that the first coupling unit has a restoring element, wherein displacing the first sliding unit in the direction of the distal terminal position is performed counter to the restoring force of the restoring element, and/or wherein the second coupling unit has a restoring element, wherein displacing the second sliding unit in the direction of the proximal terminal position is performed counter to the restoring force of the restoring element. It is achieved as a result that the first Bowden cable and an operating element connected to the first Bowden cable are nevertheless preloaded in the decoupled state and non-activated state. Coupling is facilitated as a result, because the first sliding unit is positioned as far as possible toward the front in the insertion direction and is also positionally stable by virtue of the restoring force. In terms of the second sliding unit, the restoring element has the effect that the functional element is kept in a non-activated position in the decoupled state.

The restoring element is a mechanical spring, in particular a coil spring, wherein the coil spring encloses the core of the respective Bowden cable in an encircling manner, or the core penetrates the coil spring, respectively.

In principle, both coupling units may have a restoring element. However, it is considered advantageous for only one of the coupling units, particularly the first coupling unit, to have a restoring element. The Bowden cable of this coupling unit is connected to an activation element, for example a brake lever. In contrast, a restoring element is typically not required in the coupling unit which is connected to the functional element to be activated, for example in the form of a brake, because functional elements typically already possess corresponding restoring elements.

The first and/or the second sliding unit, in particular the main body of the respective sliding unit, have/has a blind bore for receiving the restoring element.

In order to require ideally few different components in order for the Bowden cable coupling to be implemented, it is considered advantageous for the sliding units and/or the guide bushings and/or the coupling units to be in each case of identical configuration.

The assembly according to the invention has an activation element, for example in the form of a brake lever, and a functional element, for example in the form of a brake, which is activatable by the activation element, wherein the assembly has a first component and a second component which is able to be disassembled from the first component, or able to be folded away from the first component, wherein the activation element is attached to the first component and the functional element is attached to the second component, wherein the activation element and the functional element are operatively connected to one another by way of the Bowden cable coupling according to the invention or one of the afore-mentioned embodiments of the Bowden cable coupling, wherein the coupling sleeve is attached so as to be locationally fixed on the second component. To this extent, the previously described first case, in which the coupling sleeve is stationary, is implemented in this design.

In an embodiment, the activation element is a brake lever, and the functional element is a brake.

The components are components of a bicycle, in particular of a folding bicycle, of a pram, of a wheelchair or of a therapy chair.

The first component is a handlebar or a handle, and the second component is a main body with wheels.

BRIEF DESCRIPTION OF THE DRAWING FIGURES

The invention will be explained in more detail with reference to the accompanying drawing figures by means of the exemplary embodiments provided herein, without being limited to the latter.

DETAILED DESCRIPTION OF EXEMPLARY EMBODIMENTS

Figure 13:
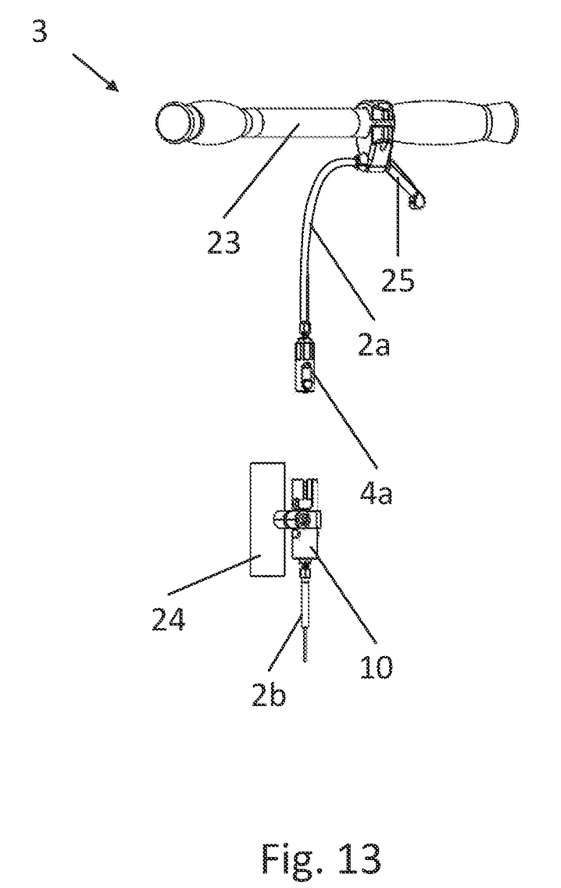
FIG. 13 shows sub-components of a bicycle having a Bowden cable coupling.

FIGS. 1 to 11 show a Bowden cable coupling 1 for releasably coupling or connecting a first Bowden cable 2a to a second Bowden cable 2b. In the coupled state, the two Bowden cables 2a, 2b form a functional Bowden cable. The Bowden cable coupling 1 enables an activation element and a functional element which is to be activated by the activation element, such as, for example, a brake lever and a brake which are operatively connected to one another by way of the two Bowden cables 2a, 2b, to be separated from one another and connected to one another again rapidly and without complication, for example so as to achieve rapid disassembling and assembling, and/or to achieve folding functions, such as in a folding bicycle, for example, without impediment by the Bowden cable. By way of example, the use of the Bowden cable coupling 1 on a bicycle 3 is shown in FIG. 13. The first Bowden cable 2a herein is connected to a brake lever 25 which is attached to a handlebar 23 of the bicycle 3. The second Bowden cable is connected to a brake which is not illustrated in more detail and is attached to a bicycle frame of the bicycle 3. Of the bicycle frame, only a sub-region of a head tube 24 is illustrated. Coupling and decoupling of the two Bowden cables 2a, 2b is performed by a manual push-twist or twist-pull movement which will be described in detail hereunder.

The Bowden cable coupling 1 comprises a first coupling unit 4a which is connected to the first Bowden cable 2a, and a second coupling unit 4b which is connected to the second Bowden cable 2b. The two coupling units 4a, 4b are connected to one another by way of a coupling sleeve 10, as a result of which the first Bowden cable 2a and the second Bowden cable 2b are connected to one another so as to form a functional Bowden cable. The constituent parts of the Bowden cable coupling 1, specifically the first coupling unit 4a, the second coupling unit 4b and the coupling sleeve 10 are separately illustrated in FIGS. 3 to 5.

Figure 8:
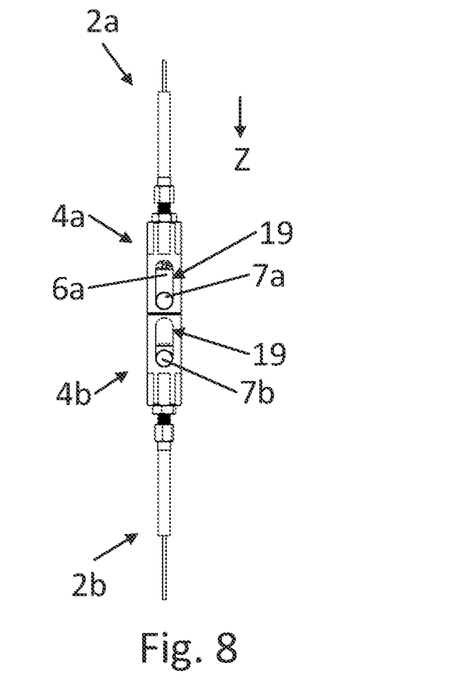
FIG. 8 shows the Bowden cable coupling according to FIG. 6 in an illustration without the coupling sleeve.
Figure 9:
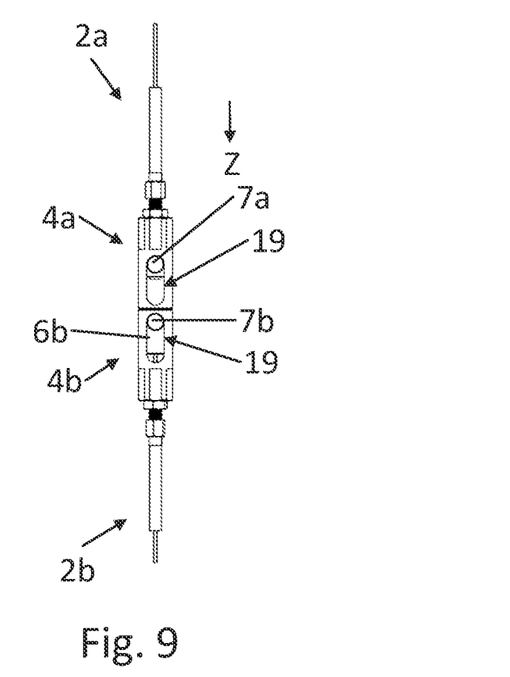
FIG. 9 shows the Bowden cable coupling according to FIG. 7 in an illustration without the coupling sleeve.

The first coupling unit 4a has a first guide bushing 5a. The first guide bushing 5a forms a counter-bearing for a Bowden cable sheath 11 which encloses the core 8 of the first Bowden cable 2a, wherein an adjustment screw 9 is connected to the first guide bushing 5a, wherein an effective length of the Bowden cable sheath 11 of the first Bowden cable 2a that encloses the core 8 is adjustable by way of this adjustment screw 9. The core 8 of the first Bowden cable 2a penetrates the adjustment screw 9 and the first guide bushing 5a in an axial direction Z which corresponds to the longitudinal direction of extent of the first Bowden cable 2a. A first sliding unit 6a, 7a, which is mounted in the first guide bushing 5a so as to be displaceable in the axial direction Z, is connected to the core 8 of the first Bowden cable 2a. The first sliding unit 6a, 7a is configured in multiple parts and has a main body 6a, which is guided axially within the first guide bushing 5a, and a locking pin 7a for securing the main body 6a against falling out of the first guide bushing 5a. The locking pin 7a penetrates the main body 6a transversely to the axial direction Z, wherein the portions of the locking pin 7a that project in relation to the main body 6a penetrate opposite guide slots 19 (FIG. 8; FIG. 9) of the first guide bushing 5a running in the axial direction Z and project in the transverse direction, thus in a radially outward manner, in relation to the first guide bushing 5a.

Figure 10:
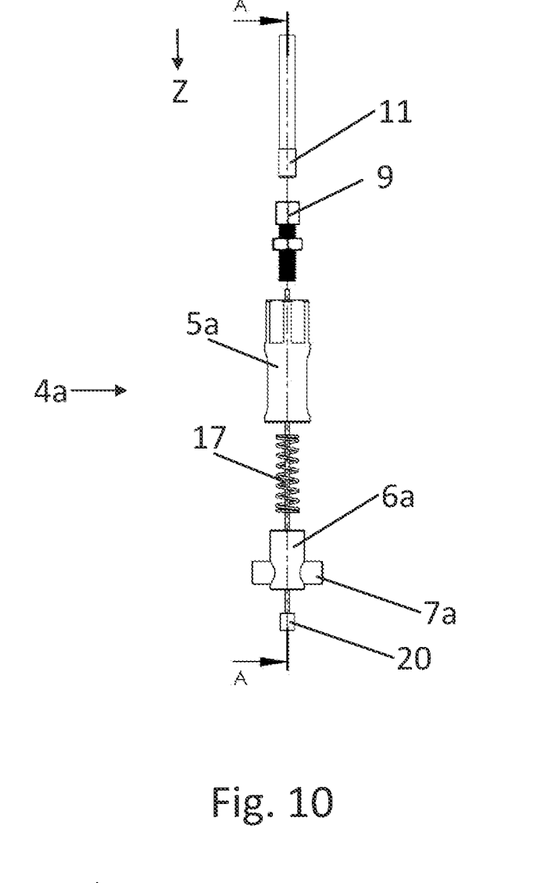
FIG. 10 shows the first coupling unit in an exploded illustration.
Figure 11:
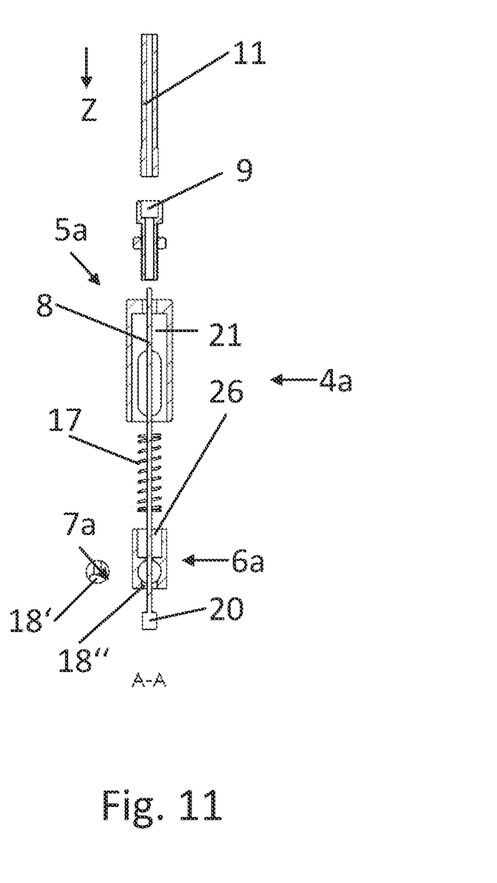
FIG. 11 shows the first coupling unit in a sectional illustration according to line A-A in FIG. 10.

The fastening of the core 8 to the first sliding unit 6a, 7a is performed by a retaining nipple 20 (FIG. 10; FIG. 11) which is connected to the core 8 of the first Bowden cable 2a, wherein the first sliding unit 6a, 7a has a nipple bearing 18 (FIG. 12) corresponding to the retaining nipple 20. The nipple bearing 18 in the sliding unit 6a, 7a forms a counter-bearing for the retaining nipple 20 in the event of a tensile load acting on the Bowden cable, wherein the nipple bearing 18 receives the retaining nipple 20 in the form-fitting manner. A passage opening is adjacent to the nipple bearing 18, wherein the core 8 of the first Bowden cable 2a leads through the passage opening.

Figure 12:
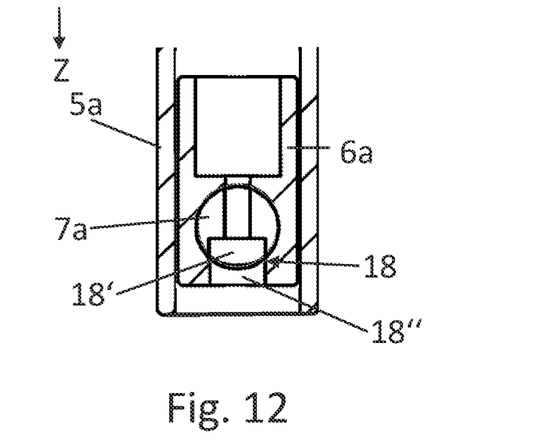
FIG. 12 shows components of the first coupling unit in an assembled state.

Assembling the first coupling unit 4a is presently performed as follows: first, the main body 6a is inserted into the first guide bushing 5a. Thereafter, the locking pin 7a is inserted perpendicularly to the axial direction Z into the main body 6a so as to secure the main body 6a against falling out of the first guide bushing 5a. The main body 6a and the locking pin 7a have in each case a passage opening for the core 8 of the first Bowden cable 2a. During assembling, the locking pin 7a is inserted in such a manner that the passage opening of the locking pin 7a and the passage opening of the main body 6a are co-aligned. These passage openings in this instance are inevitably also co-aligned with the passage opening of the first guide bushing 5a. Thereafter, the core 8 is threaded in such a manner that the core 8 penetrates the co-aligned passage openings of the main body 6a, locking pin 7a and first guide bushing 5a. This state is illustrated in FIG. 11, wherein the locking pin 7a in FIG. 11 is illustrated so as to be offset toward the left in relation to its actual position for the sake of clarity. FIG. 12 shows the arrangement of guide bushing 5a, main body 6a and locking pin 7a without any offset, in a state after the locking pin 7a has been inserted into the main body 6a and before the core 8 has been threaded.

The locking pin 7a and the main body 6a have sub-regions 18', 18" which are mutually adjacent in the axial direction Z and formed the nipple bearing 18. In the assembled state, the retaining nipple 20 is disposed partially in the sub-region 18' configured in the locking pin 7a and partially in the sub-region 18" of the nipple bearing 18 configured in the main body 6a. As a result, the locking pin 7a can no longer be extracted from the main body 6a or fall out of the latter.

The second coupling unit 4b is configured so as to be substantially identical to the first coupling unit 4a and, in a manner analogous to the first coupling unit 4a, has a second guide bushing 5b and a second sliding unit 6b, 7b having a main body 6b and a locking pin 7b, wherein the core 8 of the second Bowden cable 2b is connected to the second sliding unit 6b, 7b in the same manner as the core 8 of the first Bowden cable 2a is connected to the first sliding unit 6a, 7a.

Coupling the two Bowden cables 2a, 2b to one another is performed by way of the coupling sleeve 10. The coupling sleeve 10 is configured so as to be a substantially hollow cylinder, and is open at ends 12, 13 that lie opposite one another in the axial direction Z. The second coupling unit 4b is disposed in the one end 13 and non-releasably connected to the coupling sleeve 10 in such a manner that the second guide bushing 5b in the coupling sleeve 10 is mounted so as to be displaceable in the axial direction Z and the second sliding unit 6b, 7b is connected to the coupling sleeve 10 so as to be positionally fixed. For this purpose, the coupling sleeve 10 has receptacle openings which are formed by a transverse bore 16, wherein the opposite ends of the locking pin 7b are mounted so as to be positionally fixed and non-releasable in the transverse bore 16, as a result of which the second coupling unit 4b is non-releasably connected to the coupling sleeve 10. A releasing capability by the user is at least not envisaged.

Figure 1:
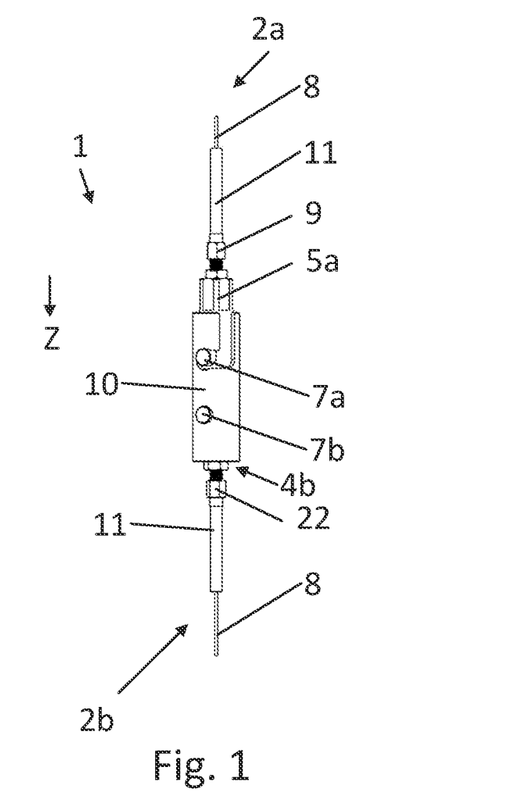
FIG. 1 shows a Bowden cable coupling having a first coupling unit of a first Bowden cable, a second coupling unit of a second Bowden cable, and a coupling sleeve for coupling the coupling units, in a coupled state.
Figure 2:
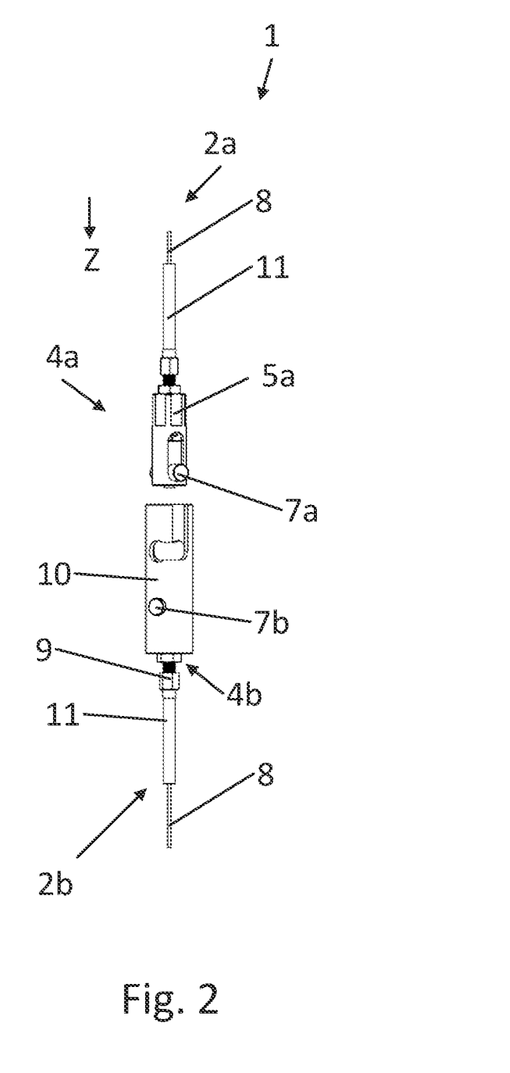
FIG. 2 shows the Bowden cable coupling according to FIG. 1 in a decoupled state.
Figure 3:
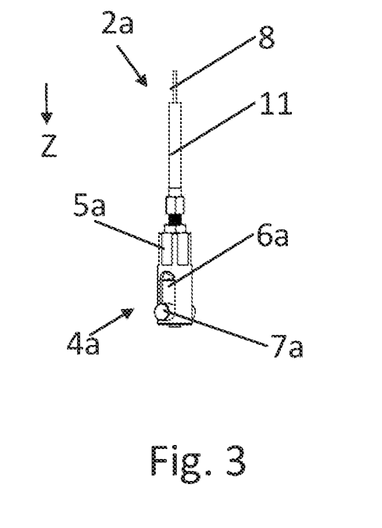
FIG. 3 shows the first coupling unit of the Bowden cable coupling according to FIG. 1.
Figure 4:
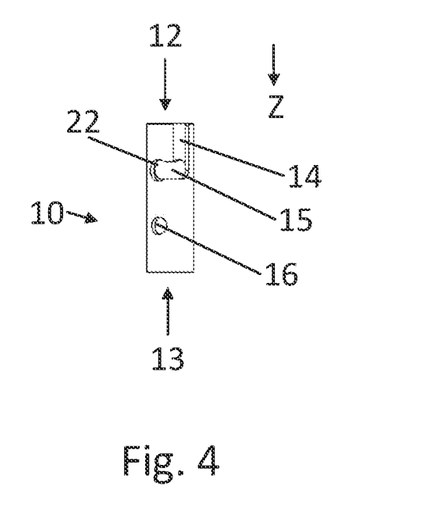
FIG. 4 shows the coupling sleeve of the Bowden cable coupling according to FIG. 1.
Figure 5:
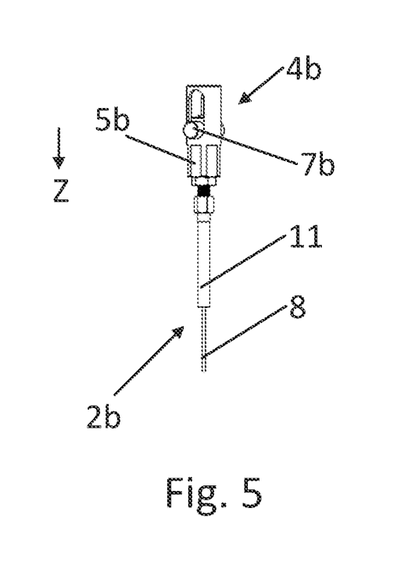
FIG. 5 shows the second coupling unit of the Bowden cable coupling according to FIG. 1.

As opposed to the second coupling unit 4b, the first coupling unit 4a is releasably connected to the coupling sleeve 10, specifically by way of a bayonet closure. Accordingly, connecting and releasing, or coupling and decoupling, respectively, is performed by a manual push-twist or twist-pull movement. For this purpose, the first sliding unit 6a, 7a has a first constituent part of the bayonet closure which is formed by the opposite ends of the locking pin 7a that project outward in the radial direction in relation to the first guide bushing 5a. The coupling sleeve 10 has the second constituent part of the bayonet closure which corresponds to the protrusions, presently in the form of opposite longitudinal slots 14 which proceed from the end 12 and run in the axial direction Z, and a transverse slot 15 which is adjacent to the respective longitudinal slot 14. Overall, this results in each case in an L-shaped slot. At the end of the transverse slot 15, this L-shaped slot transitions into a transverse bore 22, wherein the transverse bore 22 has a larger diameter than the transverse bore 16 for the locking pin 7b of the second coupling unit 4b. In order for the first coupling unit 4a to be connected, the latter in the rotary position illustrated in FIG. 2 is inserted in the axial direction Z into the coupling sleeve 10, and the first sliding unit 6a, 7a is transferred to the closure position of the bayonet closure, which is shown in FIG. 1, by rotating the first coupling unit 4a about the axial direction Z. In the closure position, the first guide bushing 5a is mounted in the coupling sleeve 10 so as to be displaceable in the axial direction Z, whereas the first sliding unit 6a, 7a is coupled in the axial direction Z to the coupling sleeve 10. For improved gripping, the end of the first guide bushing 5a facing the adjustment screw 9 has a hexagonal surface. A good grip could for example also be achieved by knurling this region.

The mutual spacing of the transverse bores 16 and 22 of the coupling sleeve 10 is chosen in such a way that, when inserting the first coupling unit 4a into the coupling sleeve 10, the first coupling unit 4a has to be pressed against the second coupling unit 4b in order to displace the second guide bushing 5b so far that the locking pin 7a of the first sliding unit 6a, 7a can be latched into the larger transverse bore 22. Since the L-shaped slot 14, 15 which guides the locking pin 7a is significantly narrower than the diameter of the transverse bore 22, the locking pin 7a, and thus the first sliding unit 6a, 7a, as a result of the counter-pressure of the second coupling unit 4b is pressed against the periphery of the transverse bore 22 that faces away from the second coupling unit 4b, and thus no longer latches to the coupling sleeve 10. An unintentional release is prevented by the counter-pressure of the second coupling unit 4b. In the event of a tensile load acting on the core 8 of the first Bowden cable 2a, the locking pin 7a is likewise supported on this periphery. In the embodiment illustrated, the transverse bore 22 has a diameter which is approx. 2 mm larger than the width of the L-shaped slot 14, 15. In this way, the effort in terms of force when coupling and decoupling remains relatively minor, on the one hand, and unintentional decoupling is prevented by the latching travel of 1 mm, on the other hand.

The first sliding unit 6a, 7a of the first coupling unit 4a is guided linearly in the guide slot 19 of the first guide bushing 5a, between a proximal terminal position facing the second coupling unit 4b and a distal terminal position facing away from the second coupling unit 4b. The same applies in an analogous manner to the second sliding unit 6b, 7b of the second coupling unit 4b. As opposed to the second coupling unit 4b, the first coupling unit 4a has a restoring element in the form of a compression spring 17 (FIG. 10; FIG. 11) which acts on the first sliding unit 6a, 7a. The compression spring 17 is mounted in a blind bore 21 (FIG. 11) of the first guide bushing 5a and in a blind bore 26 (FIG. 11) of the main body 6a, wherein the core 8 penetrates the compression spring 17 in the axial direction Z. Displacing the first sliding unit 6a, 7a in the direction of the distal terminal position is performed counter to the restoring force of the compression spring 17. Therefore, the compression spring 17 ensures that the first Bowden cable 2a remains preloaded in the decoupled state, as a result of which the retaining nipple 20 remains in the nipple bearing 18. This is particularly advantageous when the first Bowden cable 2a is connected to an activation element, e.g. a brake lever 25 as in FIG. 12, which does not have a dedicated restoring element. In contrast, a restoring element is not necessary in the second coupling unit because a functional element, e.g. a disk brake, to be activated typically has a corresponding restoring element.

Figure 6:
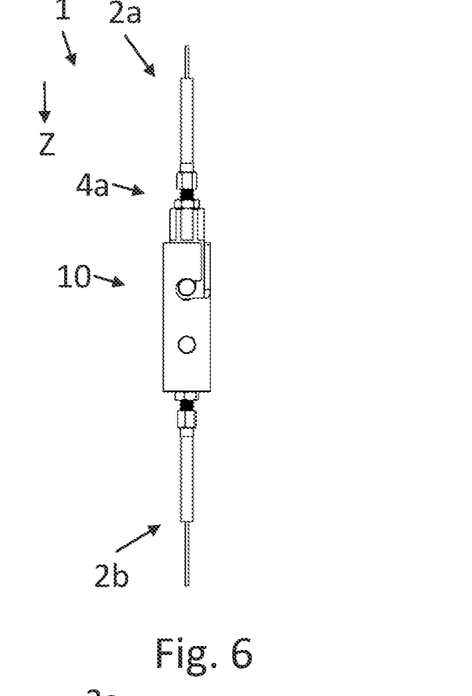
FIG. 6 shows the Bowden cable coupling according to FIG. 1 in a non-activated state.
Figure 7:
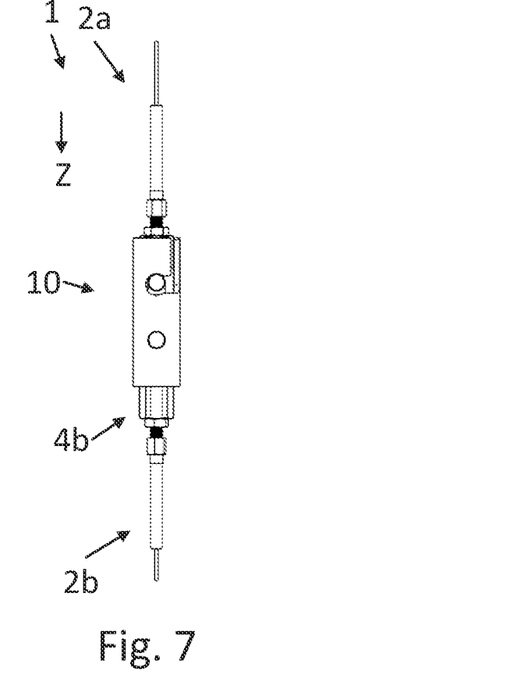
FIG. 7 shows the Bowden cable coupling according to FIG. 1 in an activated state.

The functional mode of the Bowden cable coupling 1 will be explained in more detail hereunder by means of FIGS. 6 to 9. FIGS. 6 and 8 show the Bowden cable coupling 1 in a coupled non-activated state. By virtue of the compression spring 17 and the restoring forces of the functional element connected to the second Bowden cable 2b, the first sliding unit 6a, 7a is in the non-activated state in the proximal terminal position, and the second sliding unit 6b, 7b is in the distal terminal position, as can be seen in particular from FIG. 8. Because the guide bushings 5a, 5b are supported on one another, as can be derived in particular from FIGS. 8 and 9, when the coupled Bowden cables 2a, 2b are activated, the first sliding unit 6a, 7a is displaced to the distal terminal position, and by virtue of the coupling by way of the coupling sleeve 10, the second sliding unit 6b, 7b is accordingly displaced to the proximal terminal position, as is derived from FIGS. 8 and 9. As a result, the functional element, for example a disk brake, connected to the second Bowden cable 2b is activated. Since the coupling sleeve 10 follows the movement of the sliding units 6a, 7a, or 6b, 7b, the coupling sleeve 10 is displaced relative to the guide bushings 5a, 5b, as can also be seen from a comparison of FIG. 6 and FIG. 7.

In principle, it is conceivable that the coupling sleeve 10 is displaceable and the Bowden cable sheaths 11 are stationary. Against the background of simple coupling and decoupling it is however considered advantageous for the coupling sleeve 10 to be stationary, for example to be fastened to a head tube 24 of the bicycle frame, as is shown by way of example in FIG. 13. In the case of a stationary coupling sleeve 10, the sliding units 6a, 7a, 6b, 7b are fixedly established, and when the coupled Bowden cables 2a, 2b are activated the cores 8 are not moved relative to the Bowden cable sheaths 11, as is customary, because the position of the sliding units 6a, 7a, 6b, 7b is fixedly established by the stationary coupling sleeve 10, but the Bowden cable sheaths 11 are instead displaced correspondingly in relation to the stationary cores 8, because the guide bushings 5a, 5b are displaced relative to the stationary coupling sleeve 10 when the Bowden cables 2a, 2b are activated. Both possibilities, specifically a displaceable coupling sleeve 10 and a stationary coupling sleeve 10, lead to the same result, specifically to a relative movement of the guide bushings 5a, 5b and of the coupling sleeve 10 in relation to one another.

That which is claimed is:

1. A Bowden cable coupling for releasably coupling a first Bowden cable to a second Bowden cable, comprising:
    a first coupling unit, wherein the first coupling unit has a first guide bushing and a first sliding unit, wherein the first sliding unit is connected to a first core of the first Bowden cable, wherein the first guide bushing has a first passage opening for receiving the first core of the first Bowden cable, wherein the first sliding unit is mounted in the first guide bushing so as to be displaceable in an axial direction;
    a second coupling unit, wherein the second coupling unit has a second guide bushing and a second sliding unit, wherein the second sliding unit is connected to a second core of the second Bowden cable, wherein the second guide bushing has a second passage opening for receiving the second core of the second Bowden cable, wherein the second sliding unit is mounted in the second guide bushing so as to be displaceable in the axial direction; and
    a coupling sleeve;
    wherein the second coupling unit is connected to the coupling sleeve, wherein the second guide bushing is mounted in the coupling sleeve so as to be displaceable in the axial direction, and the second sliding unit is connected to the coupling sleeve so as to be positionally fixed; and wherein the first coupling unit is releasably connected to the coupling sleeve by way of a bayonet closure, wherein the first sliding unit has a first constituent part of the bayonet closure and the coupling sleeve has a second constituent part of the bayonet closure that corresponds to the first constituent part, wherein the first coupling unit is insertable into the coupling sleeve in the axial direction and the first sliding unit by rotating in a rotation direction about the axial direction is able to be transferred to a closure position of the bayonet closure, wherein in the closure position of the bayonet closure the first guide bushing is mounted in the coupling sleeve so as to be displaceable in the axial direction and the first sliding unit is coupled to the coupling sleeve in such a way that in the closure position of the bayonet closure relative movements of the first sliding unit and the second sliding unit in relation to the first guide bushing and the second guide bushing, respectively, are mutually coupled by way of the coupling sleeve.

2. The Bowden cable coupling as claimed in claim 1, wherein the respective first guide bushing and the second guide bushing forms a counter-bearing for a Bowden cable sheath of the respective first Bowden cable and the second Bowden cable.

3. The Bowden cable coupling as claimed in claim 1, wherein the first guide bushing and the second guide bushing are supported on one another in the axial direction.

4. The Bowden cable coupling as claimed in claim 1, wherein the first sliding unit has protrusions that project radially outward in relation to the first guide bushing and form the first constituent part of the bayonet closure, and the coupling sleeve has a longitudinal slot which proceeds from an insertion end of the coupling sleeve and runs in the axial direction and on a rear closed end thereof transitions into a transverse slot.

5. The Bowden cable coupling as claimed in claim 4, wherein the first sliding unit has a first main body which is guided axially in the first guide bushing, wherein the first sliding unit has a first locking pin for securing the first main body against falling out of the first guide bushing, wherein the first locking pin penetrates the first main body and the first guide bushing transversely to the axial direction, and wherein opposite ends of the first locking pin form the protrusions of the bayonet closure that project radially outward.

6. The Bowden cable coupling as claimed in claim 1, wherein the second sliding unit has a second main body which is guided axially in the second guide bushing, wherein the second sliding unit has a second locking pin for securing the second main body against falling out of the second guide bushing, wherein the second locking pin penetrates the second main body and the second guide bushing transversely to the axial direction, and wherein opposite ends of the second locking pin are received in a form-fitting manner in opposite receptacle openings of the coupling sleeve.

7. The Bowden cable coupling as claimed in claim 1, wherein the second coupling unit is non-releasably connected to the coupling sleeve.

8. The Bowden cable coupling as claimed in claim 1, wherein the first sliding unit in the first guide bushing is displaceable in the axial direction between a first proximal terminal position facing the second coupling unit and a first distal terminal position facing away from the second coupling unit, and/or wherein the second sliding unit in the second guide bushing is displaceable in the axial direction between a second proximal terminal position facing the first coupling unit and a second distal terminal position facing away from the first coupling unit.

9. The Bowden cable coupling as claimed in claim 8, wherein the first coupling unit has a first restoring element, wherein displacing the first sliding unit in the direction of the first distal terminal position is performed counter to a restoring force of the first restoring element, and/or wherein the second coupling unit has a second restoring element, wherein displacing the second sliding unit in the direction of the second proximal terminal position is performed counter to a restoring force of the second restoring element.

10. The Bowden cable coupling as claimed in claim 9, wherein only the first coupling unit has the first restoring element.

11. The Bowden cable coupling as claimed in claim 1, wherein the first sliding unit has a first nipple bearing and a passage opening which is adjacent to the first nipple bearing and runs in the axial direction, wherein the first core of the first Bowden cable penetrates the passage opening of the first sliding unit and a first retaining nipple that is connected to the first core of the first Bowden cable is mounted in the first nipple bearing, and/or wherein the second sliding unit has a second nipple bearing and a passage opening which is adjacent to the second nipple bearing and runs in the axial direction, wherein the second core of the second Bowden cable penetrates the passage opening of the second sliding unit and a second retaining nipple that is connected to the second core of the second Bowden cable is mounted in the second nipple bearing.

12. The Bowden cable coupling as claimed in claim 11, wherein the first locking pin and the first main body of the first coupling unit and/or the second locking pin and the second main body of the second coupling unit form sub-regions of the first nipple bearing or the second nipple bearing, respectively, that are mutually adjacent in the axial direction.

13. The Bowden cable coupling as claimed in claim 1, wherein the first coupling unit has a first adjustment screw which is connected to the first guide bushing, wherein an effective length of a first Bowden cable sheath of the first Bowden cable that encloses the first core of the first Bowden cable is adjustable by way of the first adjustment screw, and/or wherein the second coupling unit has a second adjustment screw which is connected to the second guide bushing, wherein an effective length of a second Bowden cable sheath of the second Bowden cable that encloses the second core of the second Bowden cable is adjustable by way of the second adjustment screw.

14. The Bowden cable coupling as claimed in claim 13, wherein the first Bowden cable on an end thereof that faces away from the first coupling unit is operatively connected to an activation element, wherein the activation element forms a counter-bearing for the first Bowden cable sheath and, when the activation element is activated, the activation element pulls on the first core of the first Bowden cable.

15. The Bowden cable coupling as claimed in claim 1, wherein the first sliding unit and the second sliding unit and/or the first guide bushing and the second guide bushing and/or the first coupling unit and the second coupling unit are of identical configuration.

16. An assembly having an activation element, a functional element which is to be activated by the activation element, and a Bowden cable coupling as claimed in claim 1, wherein the assembly comprises a first component and a second component which is configured to be disassembled from the first component, wherein the activation element is attached to the first component and the functional element is attached to the second component, wherein the activation element and the functional element to be activated by the activation element are operatively connected to one another by way of the Bowden cable coupling, and wherein the coupling sleeve of the Bowden cable coupling is attached so as to be locationally fixed on the second component.

* * * * *